United States Patent [19]

Szostak

[11] Patent Number: 4,552,290

[45] Date of Patent: Nov. 12, 1985

[54] METHOD AND APPARATUS FOR CLEAVING OPTICAL FIBERS

[75] Inventor: Tadeusz Szostak, Gillette, N.J.

[73] Assignee: Thomas & Betts Corporation, Raritan, N.J.

[21] Appl. No.: 462,571

[22] Filed: Jan. 31, 1983

[51] Int. Cl.⁴ ............................................. C03B 37/16
[52] U.S. Cl. ......................................... 225/2; 225/96; 225/101; 225/106
[58] Field of Search ................... 225/2, 96, 96.5, 100, 225/101, 106; 350/96.1, 96.34; 65/10.2; 264/1.5

[56] References Cited

U.S. PATENT DOCUMENTS

| | | | |
|---|---|---|---|
| 3,934,773 | 1/1976 | Chinnock et al. | 225/2 |
| 3,981,422 | 9/1976 | Moore | 225/2 |
| 4,017,013 | 4/1977 | Hawk et al. | 225/96.5 |
| 4,039,309 | 8/1977 | Albanese et al. | 65/2 |
| 4,202,475 | 5/1980 | Hirai et al. | 225/2 |
| 4,203,539 | 5/1980 | Miller | 225/2 |
| 4,216,004 | 8/1980 | Brehm et al. | 65/2 |
| 4,229,876 | 10/1980 | Doty | 225/101 |
| 4,274,572 | 6/1981 | Dunn et al. | 225/96.5 |
| 4,322,025 | 3/1982 | Johnson | 225/96.5 |
| 4,377,250 | 3/1983 | Muerkl | 225/2 |
| 4,413,763 | 11/1983 | Lukas | 225/96 |
| 4,418,855 | 12/1983 | Lamarche | 225/96.5 |

OTHER PUBLICATIONS

The Bell System Technical Journal, Nov. 1973–"Optical Fiber End Preparation for Low–Loss Splices" by D. Gloge, P. W. Smith, D. L. Bisbee, and E. L. Chinnock–pp. 1579–1588.

Sumitomo Electric Technical Review–No. 19–Jan. 1980–"Optical Fiber Cutting Tool and Automatic Splicing Machine" by Y. Toda, K. Sakamoto, and K. Matsuno–pp. 85–91.

Primary Examiner—Frank T. Yost
Assistant Examiner—Hien H. Phan
Attorney, Agent, or Firm—Robert M. Rodrick; Salvatore J. Abruzzese

[57] ABSTRACT

A method and apparatus for cleaving optical fibers includes a fiber support fixed to a housing for supporting an extent of the fiber for scoring by a cleaving element. Pulling means grasp the end of fiber and offsets such fiber end relative to the fixed fiber support thereby bending the fiber about the scored location, and pulls the fiber longitudinally away from the scored location to effect a sever thereat.

8 Claims, 3 Drawing Figures

METHOD AND APPARATUS FOR CLEAVING OPTICAL FIBERS

FIELD OF THE INVENTION

This invention relates to a method and apparatus for cleaving optical fibers and more particularly pertains to a cleaving tool for providing a fiber end face having suitable optical interconnection and transmission properties.

BACKGROUND OF THE INVENTION

In interfacing fiber for optical transmission such as at splices and taps, it is essential that transmission loss at these interfaces be kept to a minimum. The major cause of transmission loss is due to the condition and alignment of the end faces of the optical fibers to be connected.

It is highly desirable to prepare an optical fiber end face to have a smooth mirror-type finish, thereby providing a greater optical transmission area across the end face. In addition, it is also desirable to provide a fiber end face which is nearly perpendicular to the longitudinal axis of the fiber. The latter is particularly important where the connection device is of the type shown and described in copending, commonly assigned application, U.S. Ser. No. 06/126,887 filed on Mar. 3, 1980, now U.S. Pat. No. 4,378,145 and entitled "Method and Apparatus for Joining Optical Elements." This type of connection device includes a series of spheres arranged to form an interstitial opening less than the fiber diameter. Thus, opposing fiber end faces abut against axially spaced-apart surfaces on the spheres. Perpendicular end faces of the fiber would insure axial alignment of the fiber in this type of connection device, and thereby enhance optical transmission. Without such perpendicularity, the fiber end faces will be relatively skewed and optical transmission will be impaired.

Optical cleaving tools are known in the art for forming connection end faces. Typically, these devices include a scoring blade which is brought into contact with the fiber to score or nick the fiber surface. About this scored point the fiber can be separated. One manner of separating the fiber is shown and described in U.S. Pat. No. 4,202,475 issued May 13, 1980 to Harai et al, wherein the fiber is moved toward the scoring blade and then bent or flexed about the scored point to effect a sever. This bending or flexing about the scored point reduces the velocity of the crack propagation through the fiber and provides an optical end face with an increased mirror zone in which optical transmission is maximized. However, while providing an increased mirror zone, bending the fiber about the scored region will not always provide a perpendicular end face.

It is also known to apply a circumferential score around the surface of an optical fiber and then to apply an opposite axial tensile force to the fiber about the scored area. Such a device is shown and described in U.S. Pat. No. 4,216,004 issued Aug. 5, 1982 to Brehm et al. While providing a more suitable perpendicular end face, the application of pure axial tension tends to provide a misty end face reducing thereby optical transmission. Also where full circumferential scoring is required, more precision and structural complexity is necessitated.

It is desirable to provide an optical fiber cleaving tool which will cleave a fiber and leave a fiber end face which is both substantially perpendicular to the axis of the fiber and has a sufficiently large mirror zone to facilitate suitable interconnection.

SUMMARY OF THE INVENTION

It is an object of the present invention to provide an optical fiber cleaving device for providing a fiber end face suitable for interconnection.

It is a more particular object of the invention to provide a cleaving tool which cleaves a fiber to have a mirror-type end face which is substantially perpendicular to the longitudinal axis of the fiber.

In the attainment of the foregoing and other objects, a method and apparatus is provided herein wherein an optical fiber is supported in a cleaving device. A fiber scoring element is brought into contact with the fiber and places a limited defect in the periphery thereof such as a nick or score along an extent supported over a support pad. The end of the fiber is grasped and moved in a direction transverse from the axis of the fiber to a position offset from the fiber support pad. The grasped end is then pulled longitudinally to sever the fiber. The resultant end face will be perpendicular to the axis of the fiber and have a sufficiently smooth mirror surface.

DETAILED DESCRIPTION OF THE PREFERRED EMBODIMENT

Figure 1:
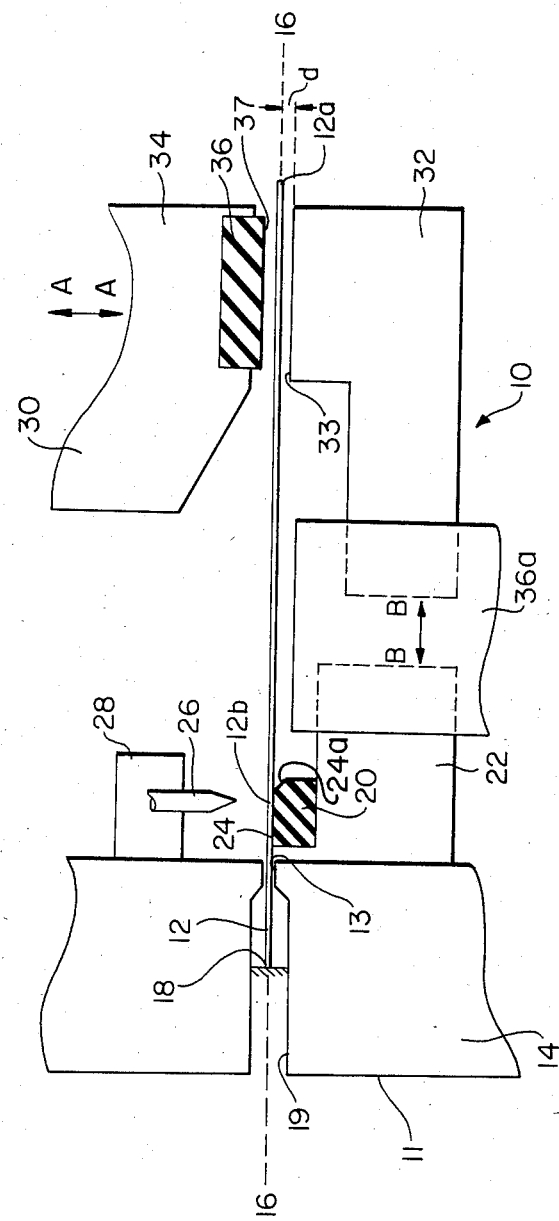
FIG. 1 is a schematic representation of the fiber cleaving device of the present invention shown in the prescoring position.

Referring to FIG. 1, there is shown schematically an optical fiber cleaving device 10 which cleaves a fiber 12 in accordance with the present invention.

Cleaving device 10 includes an elongate housing 11 having at one end thereof a fiber holding member 14 which supports the fiber so as to extend through an opening 13 and lie along a predetermined fiber axis 16. Fiber holding member 14 fixedly supports the fiber in a conventional manner at a location 18 therein. It is within the scope of the present invention to form fiber holding member 14 to receive and support the fiber directly or, as preferred, by way of example, to receive and fixedly support, in recess 19, a fiber terminating apparatus in which the fiber 12 is itself fixedly supported.

Fiber 12 is further supported along an extending portion thereof on a fiber support pad 20 adjacent opening 13. Support pad 20 is fixedly mounted to a body portion 22 of housing 11 which extends from holding member 14. Support pad 20 includes an upper support surface 24 which is parallel to and lies relatively close to fiber axis 16 to support the fiber 12 therealong. In the preferred embodiment, support pad 20 is formed of a compressable elastomeric material such as rubber and includes a tapered edge portion 24a adjacent upper surface 24 and facing away from opening 13, the purpose of which will be described in detail hereinafter.

A fiber scoring element 26 overlies supported fiber 12 directly opposite fiber support pad 20. Scoring element 26 is movably supported by scoring element support 28 for movement into contact with fiber 12. The scoring element 26 places a limited defect in the outer periphery of fiber 12 such as a nicked or scored point, which weakens the fiber thereat. The movement of the fiber scoring element 26 relative to both fiber 12 and support pad 20 can be accomplished in a manner known in the art, as for example, that shown and described in a commonly assigned co-pending U.S. patent application Ser. No. 394,526 filed July 2, 1982, such invention, however, forming no part of the instant invention.

At the end of elongate body 11, opposite holding member 14, is fiber clamping means 30. Fiber clamping means 30 includes a clamping base 32 and a fiber engagement member 34 which is spaced from and supported over fiber clamping base 32 for relative movement therewith in the direction of arrow A—A. Fiber engagement member 34 includes a clamping pad 36, which is similar to support pad 20, and a fiber engaging surface 37 for contacting the fiber 12, as will be described in detail hereinafter. Clamping base 32 further includes a clamping surface 33 which is supported thereon in fixed transverse position relative to the housing 11. Clamping surface 33, being fixed transversely, is transversely offset from support surface 24, as clamping surface 33 is spaced a greater distance, d, from axis 16.

The entire clamping means 30 is movably secured to housing 11 for movement relative to holding member 14 in the direction of arrows B—B. A central supporting collar 36a accepts ends of clamping means 30 and body portion 22 and permits relative longitudinal movement therebetween. It is apparent that the structure and relative movement of the clamping means is shown only by way of example. Any device which will support similar elements for similar relative movement, such as a spring loaded retractable pulling means, is also contemplated by the present invention.

In the pre-scored position as shown in FIG. 1, fiber 12 extends from holding member 14 linearly along axis 16, and lies on and is supported by support pad 20. The fiber extends continuously into a passage 39 formed between the normally spaced apart clamping base 32 and engaging member 34. Fiber 12 has a free-unsupported extent 12a extending through and beyond passage 39.

As above-described and still referring to FIG. 1, the fiber scoring element 26 is brought down into contact with fiber 12, and preferably scores or nicks the fiber at a location 12b therealong supported on support surface 24 thereby providing a structural fault in such fiber. Thereafter, the scoring element 26 is returned to its original position, as shown in FIG. 1. Having scored the fiber at 12b, the fiber can now be severed to leave a desirable fiber end face thereat.

Figure 2:
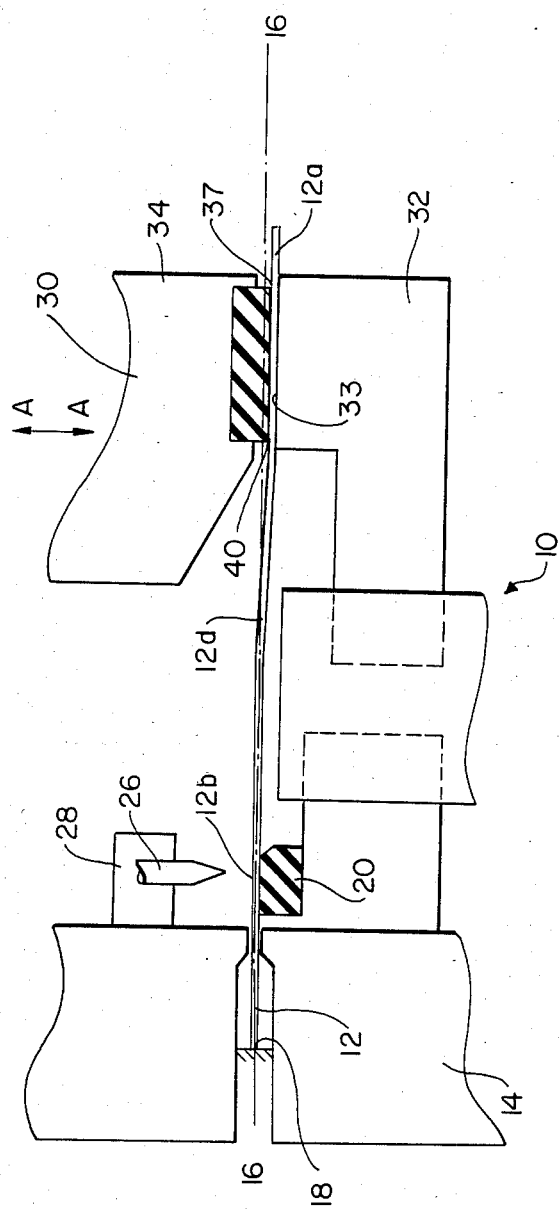
FIG. 2 shows the device of FIG. 1 shown in the post-scored position, prior to severing.

Referring now to FIG. 2, fiber clamping means 30 is shown in engagement with the free extent 12a of fiber 12. Fiber engagement member 34 is moved down so that fiber engaging surface 37 moves into contact with free extent 12a. Further downward movement (toward clamping base 32) of engagment member 34 forces free extent 12a below axis 16 as shown in FIG. 2, and into engagement with clamping base 32 against clamping surface 33, thus limiting further fiber movement. In this position, free extent 12a will be clamped by clamping means 30 between engagement surface 37 and clamping surface 33 and thus will be transversely offset from support surface 24. The amount of movement of the free extent 12a from its original position along axis 16 to its clamped position, is on the order of 0.020 inch, or about 1.5°–2.0°. As free extent 12a has been moved from the position shown in FIG. 1 to the position shown in FIG. 2, and as the fiber is not completely severed at location 12b, the fiber will trace a non-linear path between fixed location 18 on holding member 14 and the clamped extent at location 40 of the clamping means 30. The amount of movement of free extent 12a is sufficient to provide such non-linear path, yet insufficient to sever the fiber. As free extent 12a is bent down as shown in FIG. 2, the fiber 12 will bow or curve upwardly beginning at fixed location 18 and rise slightly off support surface 24, only tangentially engaging the upper corner of tapered edge portion 24a, and reaching the apex of the bow adjacent scored location 12b. Thereafter the curve will continue and free extent 12a will extend below axis 6. At an inflection point 12d adjacent clamped extent location 40, the curvature will change and, the concavity of the fiber extent being reversed by reason of its engagement with clamping means 30 at location 40. Such fiber curvature is shown in FIG. 2 and is greatly exaggerated for clarity. As the transverse movement of free extent 12a is only about 0.020 inch at the clamped portion, the radius of such curvature of each curved portion of free extent 12a is relatively large, being on the order of fifty inches. However, this curvature is sufficient to provide both the tensile force on the fiber due to bending at the area of the score, and compressive force at the area diametrically opposite the score to effect a suitable cleave. As described, U.S. Pat. No.3,934,773 issued Jan. 27, 1976 to Chinnock et al, this bending of the fiber at or near the scored region reduces the velocity at which the crack propagates through the fiber and thus results in a smooth end face with a greater mirror region upon severing.

Having now scored and flexed the fiber 12 by transversely offsetting the free extent 12a, the free extent may be severed from the held portion of fiber 12.

Figure 3:
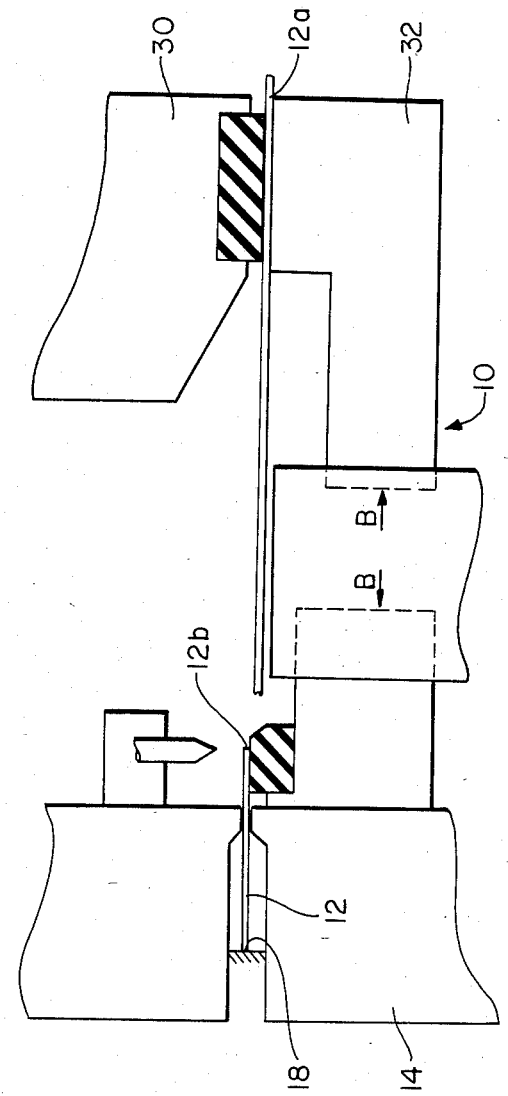
FIG. 3 is the device of FIG. 2 showing the fiber in the severed position.

As shown in FIG. 3, clamping means 30 being clamped about free extent 12a, is pulled longitudinally in the direction of arrows B—B away from the fixed fiber location 18 in holding member 14. This will sever the fiber extent 12a from the fiber 12 at the scored point 12b, that now being the weakest point along the fiber. The longitudinal pulling of the free extent 12a from the fiber 12 is accomplished while the fiber is bent or flexed at or about the scored location 12b. It is this longitudinal pulling applied simultaneously while the fiber is flexed that provides the superior cleaving results and an end face which is suitable for interconnection with another fiber or other optical element. At the scored point 12b, the fiber 12 will have a smooth end face as the velocity of crack propagation is reduced due to bending, and will have an end face which is substantially perpendicular to the longitudinal axis of the fiber as the fiber is pulled longitudinally.

Various other modifications to the foregoing disclosed embodiment will be evident to those skilled in the art. Thus, the particularly described preferred embodiment is intended to be illustrative and not limited thereto. The true scope of the invention is set forth in the following claims.

What is claimed is:

1. An apparatus for cleaving an elongate optical fiber comprising:
   a housing;
   a holder on said housing fixedly supporting said fiber thereat, said holder defining a pre-determined fiber axis;

a fiber support on said housing for supporting a longitudinal extent of said fiber spaced from said holder along said pre-determined fiber axis;

a cleaving element movably supported on said housing adjacent said fiber support for scoring said fiber at said longitudinal extent; and a fiber pulling means for grasping said fiber at a location spaced from said fiber support and for pulling said fiber in a direction parallel to said fiber axis, said pulling means including a clamping member having a fiber engaging surface movable transversely relative to said fiber axis, independently of the movement of said fiber pulling means from a first position non-intersecting said fiber axis to a second position intersecting said fiber axis for thereby moving a portion of said fiber to a clamping position offset from said fiber axis.

2. The apparatus in accordance with claim 1 wherein said fiber support includes a resilient support pad for resiliently supporting said longitudinal extent.

3. The apparatus in accordance with claim 1 wherein said fiber engaging surface is resilient.

4. The apparatus in accordance with claim 3 wherein said fiber clamping surface is positioned opposite said fiber engaging surface.

5. The apparatus in accordance with claim 4 wherein said second position of said fiber engaging surface is offset transversely from said fiber axis.

6. The apparatus in accordance with claim 1 wherein said clamping member further includes a fiber clamping surface fixedly supported to said housing for engagement with said fiber engaging surface in said second position.

7. The apparatus in accordance with claim 6 wherein said fixed fiber clamping surface limits the amount of movement fiber engaging surface, thereby moving said portion of said fiber an amount insufficient to sever said fiber at said scored location.

8. The apparatus in accordance with claim 7 wherein said second position of said fiber engaging surface is transversely offset from said fiber support.

* * * * *